(12) United States Patent
Wang et al.

(10) Patent No.: US 12,374,881 B2
(45) Date of Patent: Jul. 29, 2025

(54) ELECTROSTATIC DISCHARGE CIRCUIT

(71) Applicant: MACRONIX INTERNATIONAL CO., LTD., Hsinchu (TW)

(72) Inventors: Shih-Yu Wang, Taipei (TW); Wen-Tsung Huang, Changhua County (TW); Chih-Wei Hsu, Changhua County (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 152 days.

(21) Appl. No.: 18/363,018

(22) Filed: Aug. 1, 2023

(65) Prior Publication Data

US 2025/0047096 A1    Feb. 6, 2025

(51) Int. Cl.
*H02H 9/04*    (2006.01)
(52) U.S. Cl.
CPC .................................. *H02H 9/041* (2013.01)
(58) Field of Classification Search
CPC .............................. H02H 9/041; H02H 9/046
USPC .............................................................. 361/56
See application file for complete search history.

(56) References Cited

U.S. PATENT DOCUMENTS

| | | | | |
|---|---|---|---|---|
| 5,838,146 A * | 11/1998 | Singer | .................... | H02H 9/046 323/270 |
| 5,986,861 A * | 11/1999 | Pontarollo | ........... | H10D 89/601 361/91.5 |
| 6,385,028 B1 * | 5/2002 | Kouno | ............. | H03K 17/08122 361/111 |
| 6,576,974 B1 * | 6/2003 | Chang | .................. | H10D 10/311 977/936 |
| 8,576,524 B1 * | 11/2013 | Zupcau | .................. | H02H 9/046 361/56 |
| 8,861,158 B2 * | 10/2014 | Zupcau | ................ | H10D 89/931 361/91.1 |
| 10,879,232 B2 * | 12/2020 | Lai | ........................ | H10D 89/811 |
| 10,879,797 B2 | 12/2020 | Chang et al. | | |
| 11,081,881 B2 * | 8/2021 | Agarwal | ................ | H02H 9/046 |
| 11,108,229 B2 * | 8/2021 | Jang | ...................... | H10D 89/819 |
| 11,842,995 B2 * | 12/2023 | Xu | ........................ | H10D 89/819 |

(Continued)

FOREIGN PATENT DOCUMENTS

| | | | | |
|---|---|---|---|---|
| EP | 4071812 B1 * | 6/2024 | ........... | H10D 89/819 |
| TW | 202042369 A | 11/2020 | | |
| TW | 202139415 A | 10/2021 | | |

*Primary Examiner* — Dharti H Patel
(74) *Attorney, Agent, or Firm* — McClure, Qualey & Rodack, LLP

(57) ABSTRACT

An electrostatic discharge circuit includes a discharge switch, a first trigger circuit and a second trigger circuit. A first terminal of the discharge switch is coupled to a first power domain, and a second terminal of the discharge switch is coupled to a second power domain. The first trigger circuit is coupled between the first terminal and a control terminal of the discharge switch. The second trigger circuit is coupled between the second terminal and the control terminal. When an electrostatic discharge voltage occurs in the first power domain, the second trigger circuit is configured to form a conduction voltage between the second terminal and the control terminal to turn on the discharge switch. When the electrostatic discharge voltage occurs in the second power domain, the second trigger circuit is configured to short the second terminal and the control terminal to turn on the discharge switch.

11 Claims, 4 Drawing Sheets

(56) References Cited

U.S. PATENT DOCUMENTS

| | | | | |
|---|---|---|---|---|
| 2001/0053054 A1* | 12/2001 | Andoh | .................. | H10D 89/811 |
| | | | | 361/56 |
| 2008/0239601 A1* | 10/2008 | Miyazawa | ............... | H03F 1/523 |
| | | | | 361/56 |
| 2010/0315754 A1* | 12/2010 | Ker | ........................ | H02H 9/046 |
| | | | | 361/111 |
| 2011/0110005 A1* | 5/2011 | Benner, Jr. | .......... | H01S 5/06825 |
| | | | | 361/56 |
| 2013/0050885 A1* | 2/2013 | Chen | ........................ | H02H 9/04 |
| | | | | 361/56 |
| 2014/0177113 A1* | 6/2014 | Gueorguiev | ............. | H04R 1/04 |
| | | | | 361/56 |
| 2014/0376135 A1* | 12/2014 | Huo | .................... | H10D 89/711 |
| | | | | 361/56 |
| 2016/0134103 A1* | 5/2016 | Namizaki | ................ | H02H 9/04 |
| | | | | 361/56 |
| 2017/0366001 A1* | 12/2017 | Cao | ........................ | H02H 9/045 |
| 2019/0190256 A1* | 6/2019 | Agarwal | ............... | H02H 1/0007 |
| 2021/0242677 A1 | 8/2021 | Langguth | | |
| 2021/0320100 A1 | 10/2021 | Yang | | |
| 2022/0140599 A1* | 5/2022 | Fan | ..................... | H10D 89/819 |
| | | | | 361/56 |
| 2022/0352887 A1* | 11/2022 | Kang | ................. | H03K 17/6872 |
| 2023/0198252 A1* | 6/2023 | Mizan | ................... | H10D 89/60 |
| | | | | 361/56 |
| 2024/0321866 A1* | 9/2024 | Kang | .................. | H10D 89/819 |

\* cited by examiner

ELECTROSTATIC DISCHARGE CIRCUIT

BACKGROUND

Technical Field

The present disclosure relates to electrostatic discharge protection technology, in particular to an electrostatic discharge circuit.

Description of Related Art

In the design of integrated circuits, due to human body discharge or machine discharge, the voltage and current caused by electro static discharge are likely to cause damage to the inside of the circuit. Therefore, an electrostatic discharge circuit needs to be provided in the integrated circuit to achieve the purpose of electrostatic protection.

SUMMARY

One aspect of the present disclosure is an electrostatic discharge circuit, comprising a discharge switch, a first trigger circuit and a second trigger circuit. The discharge switch comprises a first terminal, a second terminal and a control terminal. The first terminal is coupled to a first power domain of an integrated circuit, and the second terminal is coupled to a second power domain of the integrated circuit, so that the first terminal is at a high potential relative to the second terminal. The first trigger circuit is coupled between the first terminal and the control terminal, and comprises a capacitor. The second trigger circuit is coupled between the second terminal and the control terminal. When an electrostatic discharge voltage occurs in the first power domain, the second trigger circuit is configured to form a conduction voltage between the second terminal and the control terminal to turn on the discharge switch. When an electrostatic discharge voltage occurs in the second power domain, the second trigger circuit is configured to short the second terminal and the control terminal to turn on the discharge switch.

Another aspect of the present disclosure is an electrostatic discharge circuit, comprising a discharge switch, a first trigger circuit and a second trigger circuit. The discharge switch comprises a first terminal, a second terminal and a control terminal. The first terminal is coupled to a first power domain of an integrated circuit, and the second terminal is coupled to a second power domain of the integrated circuit, so that the first terminal is at a high potential relative to the second terminal. The first trigger circuit is coupled between the first terminal and the control terminal, and comprises a capacitor. The second trigger circuit is coupled between the second terminal and the control terminal, and comprises a trigger switch. When both of a potential of the first power domain and a potential of the second power domain do not exceed a predetermined range, the trigger switch is configured to turned on according to a gate voltage to turn off the discharge switch. The trigger switch comprises a one-way switch, wherein when an electrostatic discharge voltage occurs in the second power domain, the second trigger circuit is configured to short the second terminal and the control terminal to turn on the discharge switch by the one-way switch.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
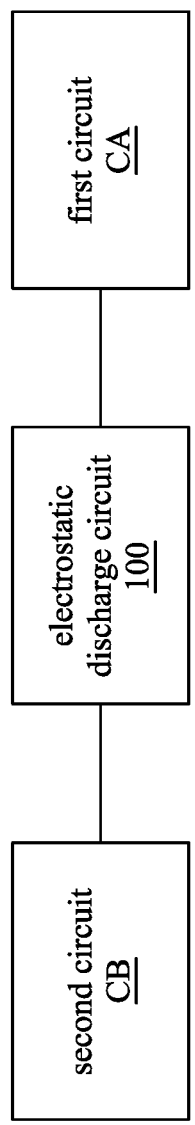
FIG. 1 is a schematic diagram of an electrostatic discharge circuit in some embodiments of the present disclosure.

FIG. 1 is a schematic diagram of an electrostatic discharge circuit 100 in some embodiments of the present disclosure. In one embodiment, the electrostatic discharge circuit 100 is applied to an integrated circuit CX, and is used to eliminate electrostatic discharge phenomena. For example, when an electrostatic discharge voltage occurs in the integrated circuit CX, the electrostatic discharge voltage will pass through the electrostatic discharge circuit 100 first, and will not be input to computing circuits in the integrated circuit CX, so as to prevent the computing function of the integrated circuit CX from being damaged. Since one skilled in art can understand the principle of electro static discharge, it will not be repeated here.

The integrated circuit CX has multiple difference power domains, that is, several different circuits in the integrated circuit CX may operate at different voltages. As shown in FIG. 1, operating voltage of a first circuit CA may be 20 volts in operation, and operating voltage of a second circuit CB may be 10 volts in operation. In this case, the first circuit CA and the second circuit CB belong to different power domains in the integrated circuit CX. When electrostatic discharge occurs, the electrostatic discharge circuit 100 will be used as a path for discharging voltage or current. In a normal state (i.e., no electrostatic discharge phenomena occurs), the electrostatic discharge circuit 100 will not be turned on by a voltage difference between different power domains, otherwise it will cause signal errors between the circuits CA and CB.

Figure 2:
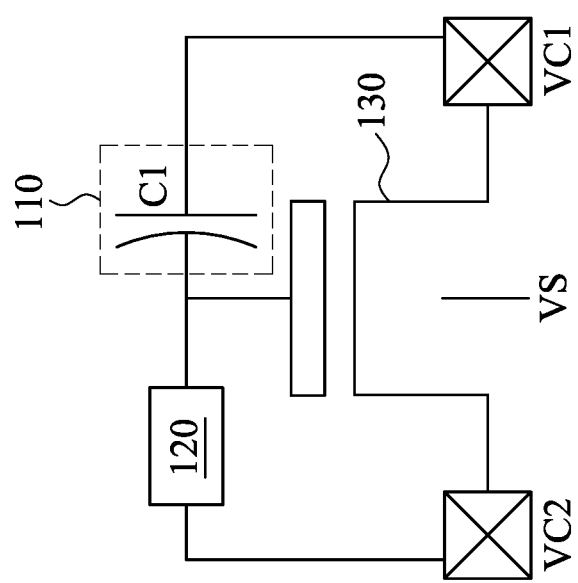
FIG. 2 is a schematic diagram of an electrostatic discharge circuit in some embodiments of the present disclosure.

FIG. 2 is a schematic diagram of an electrostatic discharge circuit 100 in some embodiments of the present disclosure. The electrostatic discharge circuit 100 includes a first trigger circuit 110, a second trigger circuit 120 and a discharge switch 130. The electrostatic discharge circuit 100 is arranged between two power domains (i.e., a first power domain VC1, and a second power domain VC2) in the integrated circuit CX (as shown in FIG. 1). When an electrostatic discharge occurs/generated in the first power domain VC1 or the second power domain VC2, the discharge switch 130 is turned on by the first trigger circuit 110 or the second trigger circuit 120 to form a discharge voltage or current path.

The discharge switch 130 includes a first terminal, a second terminal and a control terminal. The first terminal of discharge switch 130 is coupled to the first power domain VC1, and the second terminal of the discharge switch 130 is coupled to the second power domain VC2, so that the first terminal of the discharge switch 130 is at a high potential relative to the second terminal of the discharge switch 130. In other words, when the integrated circuit CX operates in the normal state (i.e., no electrostatic discharge voltage generated), voltage on the first terminal of the discharge switch 130 will be greater than voltage on the second terminal of the discharge switch 130. In some embodiments, the discharge switch 130 is a metal oxide semiconductor field effect transistor (MOSFET), and a base of the discharge switch 130 is coupled to a reference potential VS (e.g., ground), but the present disclosure is not limited thereto.

The first trigger circuit 110 is coupled between the first terminal of the discharge switch 130 (i.e., coupled to a node of the first power domain VC1) and the control terminal (e.g., gate), and at least includes a capacitor C1. When an electrostatic discharge voltage occurs in the first power domain VC1, the first trigger circuit 110 is configured to turn on the discharge switch 130, so as to form an electrostatic discharge path in the discharge switch 130.

The second trigger circuit 120 is coupled between the second terminal of the discharge switch 130 (i.e., coupled to a node of the second power domain VC2) and the control terminal (e.g., gate). When an electrostatic discharge voltage occurs in the second power domain VC2, the second trigger circuit 120 is configured to turn on the discharge switch 130, so as to form an electrostatic discharge path in the discharge switch 130.

The following describes the operation of the electrostatic discharge circuit 100. When circuits in the first power domain VC1 and the second power domain VC2 operate normally, both of a potential of the first power domain VC1 and a potential of the second power domain VC2 will not exceed a predetermined range. Since the first power domain VC1 has a higher potential than the second power domain VC2, the capacitor C1 will be gradually charged until the stored electric energy is equal to the voltage between the first power domain VC1 and the second power domain VC2. At the same time, the second trigger circuit 120 is configured to control a voltage of the control terminal to maintain the discharge switch 130 off. Specifically, the second trigger circuit 120 will continuously pull low the voltage of the control terminal of the discharge switch 130 to ensure that the voltage of the control terminal of the discharge switch 130 is at a disabled level (e.g., low potential). Therefore, the discharge switch 130 will maintain in the off state to ensure that there is no leakage between the first power domain VC1 and the second power domain VC2.

When an electrostatic discharge voltage occurs in the first power domain VC1, because of capacitive coupling effect of the capacitor C1, the first trigger circuit 110 instantly pulled up voltage of the control terminal of the discharge switch 130 to a high potential. At this moment, since the second trigger circuit 120 has no time to pull low the voltage of the control terminal of the discharge switch 130, the equivalent impedance of the second trigger circuit 120 will form a conduction voltage between the second terminal of the discharge switch 130 and the control terminal. In other words, the voltage between the control terminal and the second terminal of the discharge switch 130 will be greater than threshold voltage of the discharge switch 130, so that the discharge switch 130 is turned on.

On the other hand, when an electrostatic discharge voltage occurs in the second power domain VC2, the second trigger circuit 120 is configured to short the second terminal and the control terminal of the discharge switch 130. At this time, since the voltage of the control terminal of the discharge switch 130 will be instantly pulled up to a high potential of the electrostatic discharge voltage (i.e., enable potential), so the discharge switch 130 will be turned on.

Figure 3B:
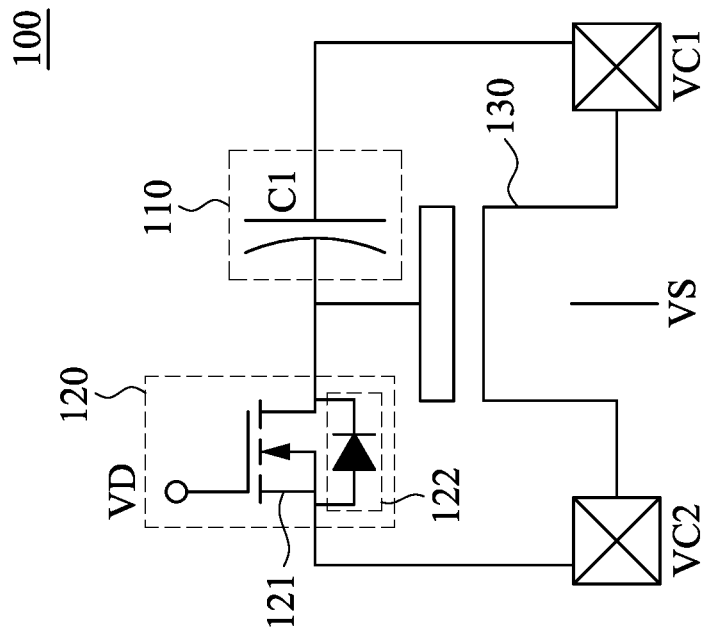
FIG. 3A-3C are schematic diagrams of an electrostatic discharge circuit in some embodiments of the present disclosure.
Figure 3A:
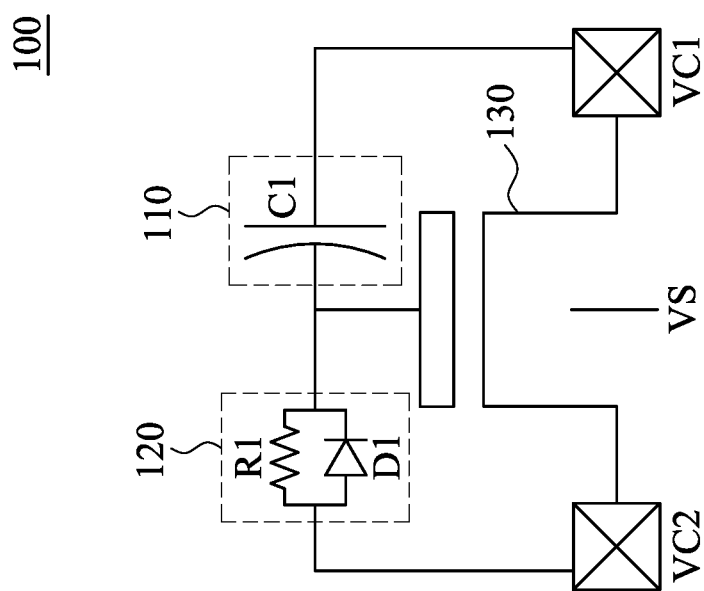
Figure 3C:
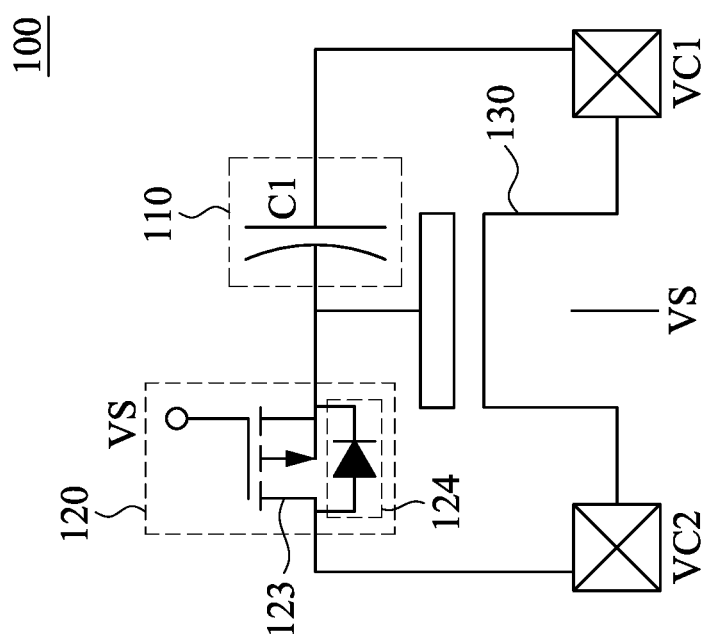

FIG. 3A-3C are schematic diagrams of an electrostatic discharge circuit 100 in some embodiments of the present disclosure. FIG. 3A-3C respectively describe different implementations of the second trigger circuit 120. In FIG. 3A-3C, the similar components associated with the embodiment of FIG. 1 are labeled with the same numerals for ease of understanding. The specific principle of the similar component has been explained in detail in the previous paragraphs, and unless it has a cooperative relationship with the components of FIG. 3A-3C, it is not repeated here.

As shown in FIG. 3A, in one embodiment, the second trigger circuit 120 includes an impedance element R1 and an one-way switch D1. The impedance element R1 and the one-way switch D1 are connected in parallel. When an electrostatic discharge voltage occurs in the first power domain VC1 so that the voltage of the control terminal of the discharge switch 130 will be instantly pulled up to a high potential, the equivalent impedance of the impedance element R1 forms a conduction voltage between the second terminal and the control terminal of the discharge switch 130 (i.e., a voltage across the impedance element R1 is greater than the threshold voltage of the discharge switch 130), so as to turn on the discharge switch 130.

When an electrostatic discharge voltage occurs in the second power domain VC2, the one-way switch D1 will be turned on to form a short circuit, so that the voltage of the control terminal of the discharge switch 130 is instantly pulled up to a high potential of the electrostatic discharge voltage to turn on the discharge switch 130. In some embodiments, the one-way switch D1 can be a diode.

Depending on where the electrostatic discharge voltage is generated/occurred, the second trigger circuit 120 has different operating characteristics. When an electrostatic discharge voltage occurs in the first power domain VC1, the second trigger circuit 120 forms a conduction voltage according to its own equivalent impedance, so that the discharge switch 130 is turned on. On the other hand, when an electrostatic discharge voltage occurs in the second power domain VC2, the second trigger circuit 120 forms a short circuit to instantly turn on the discharge switch 130 by using the electrostatic discharge voltage. Accordingly, the electrostatic discharge circuit 100 will realize two-way protection.

FIG. 3B shows another embodiment of the second trigger circuit 120. In one embodiment, the second trigger circuit 120 includes a trigger switch 121, and the trigger switch may be an N-type MOSFET, but the present disclosure is not limited thereto. The control terminal of the trigger switch 121 is coupled to a control potential VD, when the integrated circuit CX does not have an electrostatic discharge voltage (i.e., the potential of the first power domain VC1 and the second power domain VC2 does not exceed the predetermined range), the trigger switch 121 is turned on according to a gate voltage formed on a gate of the trigger switch 121 by the control potential VD. At this time, the trigger switch 121 can be regarded as the impedance element R1 in FIG. 3A, so the discharge switch 130 will maintain off.

The gate voltage provided by the control potential VD is an enable potential for the trigger switch 121. In some embodiments, the control terminal of the trigger switch 121 can be connected to the first terminal of the discharge switch 130 to use the high potential of the first power domain VC1 as a gate voltage.

In one embodiment, the trigger switch 121 further includes an one-way switch 122. When an electrostatic discharge voltage occurs in the second power domain VC2, the second trigger circuit 120 is configured to short the second terminal and the control terminal of the discharge switch 130 by the one-way switch 122, so as to turn on the discharge switch 130.

In this embodiment, the one-way switch 122 can be a parasitic diode in the trigger switch 121. For example, the trigger switch 121 is an N-type MOSFET, and a source of the trigger switch 121 is coupled to the second terminal of the discharge switch 130. The source of the trigger switch 121 is also short to the base of the trigger switch 121, so as to form a parasitic diode (the one-way switch 122) between the source and the drain. But the present disclosure is not limited thereto, in other embodiments, the one-way switch 122 can also be a diode connected in parallel with the trigger switch 121.

When an electrostatic discharge voltage occurs in the first power domain VC1, the one-way switch 122 will not be turned on, and the equivalent impedance of the trigger switch 121 will form a conduction voltage between the second terminal and the control terminal of the discharge switch 130 (i.e., a voltage across the trigger switch 121 is greater than the threshold voltage of the discharge switch 130), so as to turn on the discharge switch 130. At this time, the trigger switch 121 operates as the impedance element R1 in FIG. 3A.

When an electrostatic discharge voltage occurs in the second power domain VC2, the one-way switch 122 of the second trigger circuit 120 will be turned on to form a short circuit, so that the voltage of the control terminal of the discharge switch 130 is instantly pulled up to a high potential of the electrostatic discharge voltage to turn on the discharge switch 130. At this time, the second trigger circuit 120 operates in the same way as the one-way switch D1 in FIG. 3A.

In some embodiments, the trigger switch 121 is always maintain off according to the gate voltage provided by the control potential VD, but in other embodiments, the trigger switch 121 may also receive a disable signal to form a off state when an abnormal situation occurs in the integrated circuit, so as to increase the equivalent impedance of the second trigger circuit 120.

FIG. 3C shows another embodiment of the second trigger circuit 120. In one embodiment, the second trigger circuit 120 further includes a trigger switch 123, but the trigger switch 123 is a P-type metal oxide semiconductor field effect transistor. The control terminal of the trigger switch 123 is coupled to a reference potential VS (e.g., a low potential), so that the trigger switch 123 is maintain on. In other embodiments, the control terminal of the trigger switch 123 can be connected to the second terminal of the discharge switch 130, so that the potential of the second power supply domain VC2 can be used as the gate voltage of the control terminal of the trigger switch 123.

The drain of the trigger switch 123 is coupled to the second terminal of the discharge switch 130, and a short circuit between the source the base of the trigger switch 123, so as to form a parasitic diode (the one-way switch 124) between the source and the drain. Since the operation of the trigger switch 123 is the same as the embodiment shown in FIG. 3B, it will not be repeated here.

In addition, in some embodiments, the threshold voltage of the trigger switch 123 is smaller than the threshold voltage of the discharge switch 130, to ensure that when both of the potential of the first power domain VC1 and the potential of the second power domain VC2 do not exceed the predetermined range, the trigger switch 123 is turned on, but the voltage of the control terminal of the discharge switch 130 does not make the discharge switch 130 turn on.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An electrostatic discharge circuit, comprising:
   a discharge switch comprising a first terminal, a second terminal and a control terminal, wherein the first terminal is coupled to a first power domain of an integrated circuit, and the second terminal is coupled to a second power domain of the integrated circuit, so that the first terminal is at a high potential relative to the second terminal;
   a first trigger circuit coupled between the first terminal and the control terminal, and comprising a capacitor; and
   a second trigger circuit coupled between the second terminal and the control terminal, wherein when an electrostatic discharge voltage occurs in the first power domain, the second trigger circuit is configured to form a conduction voltage between the second terminal and the control terminal to turn on the discharge switch;
   wherein when an electrostatic discharge voltage occurs in the second power domain, the second trigger circuit is configured to short the second terminal and the control terminal to turn on the discharge switch.

2. The electrostatic discharge circuit of claim 1, wherein the second trigger circuit comprises an impedance element and a one-way switch, the impedance element and the one-way switch are connected in parallel.

3. The electrostatic discharge circuit of claim 2, wherein the one-way switch is a diode.

4. The electrostatic discharge circuit of claim 1, wherein the discharge switch is a metal oxide semiconductor field effect transistor.

5. The electrostatic discharge circuit of claim 1, wherein when both of a potential of the first power domain and a potential of the second power domain do not exceed a predetermined range, the second trigger circuit is configured to control a voltage of the control terminal to maintain the discharge switch off.

6. An electrostatic discharge circuit, comprising:
   a discharge switch comprising a first terminal, a second terminal and a control terminal, wherein the first terminal is coupled to a first power domain of an integrated circuit, and the second terminal is coupled to a second power domain of the integrated circuit, so that the first terminal is at a high potential relative to the second terminal;

a first trigger circuit coupled between the first terminal and the control terminal, and comprising a capacitor; and a second trigger circuit coupled between the second terminal and the control terminal, and comprising a trigger switch, wherein when both of a potential of the first power domain and a potential of the second power domain do not exceed a predetermined range, the trigger switch is configured to turned on according to a gate voltage to turn off the discharge switch;

wherein the trigger switch comprises a one-way switch, wherein when an electrostatic discharge voltage occurs in the second power domain, the second trigger circuit is configured to short the second terminal and the control terminal to turn on the discharge switch by the one-way switch.

7. The electrostatic discharge circuit of claim 6, wherein the one-way switch is a parasitic diode in the trigger switch.

8. The electrostatic discharge circuit of claim 7, wherein the trigger switch is a metal oxide semiconductor field effect transistor, a source of the trigger switch is coupled to the second terminal, and the source of the trigger switch is short to a base of the trigger switch to form the one-way switch in the trigger switch.

9. The electrostatic discharge circuit of claim 7, wherein the trigger switch is a metal oxide semiconductor field effect transistor, a drain of the trigger switch is coupled to the second terminal, and a source of the trigger switch is short to a base of the trigger switch to form the one-way switch in the trigger switch.

10. The electrostatic discharge circuit of claim 9, wherein a threshold voltage of the trigger switch is smaller than a threshold voltage of the discharge switch.

11. The electrostatic discharge circuit of claim 6, wherein when an electrostatic discharge voltage occurs in the first power domain, an equivalent impedance of the trigger switch is configured to form a conduction voltage between the second terminal and the control terminal to turn on the discharge switch.

\* \* \* \* \*